(12) United States Patent
Georgeson et al.

(10) Patent No.: US 8,324,911 B2
(45) Date of Patent: Dec. 4, 2012

(54) GAP MAPPING FOR FITTING COMPOSITE DOUBLERS

(75) Inventors: Gary E. Georgeson, Federal Way, WA (US); Michael W. Evens, Burien, WA (US); Michael D. Fogarty, Auburn, WA (US); Morteza Safai, Seattle, WA (US)

(73) Assignee: The Boeing Company, Chicago, IL (US)

( * ) Notice: Subject to any disclaimer, the term of this patent is extended or adjusted under 35 U.S.C. 154(b) by 644 days.

(21) Appl. No.: 11/957,767

(22) Filed: Dec. 17, 2007

(65) Prior Publication Data

US 2009/0151454 A1 Jun. 18, 2009

(51) Int. Cl.
*G01R 27/26* (2006.01)
(52) U.S. Cl. .......................................................... 324/662
(58) Field of Classification Search ................... 324/662
See application file for complete search history.

(56) References Cited

U.S. PATENT DOCUMENTS

| | | | | |
|---|---|---|---|---|
| 5,416,424 A * | 5/1995 | Andermo | .................... | 324/684 |
| 6,388,452 B1 * | 5/2002 | Picciotto | .................... | 324/663 |
| 6,756,791 B1 * | 6/2004 | Bhushan et al. | ............ | 324/671 |
| 6,801,044 B2 * | 10/2004 | Kesil et al. | .................... | 324/663 |
| 7,009,409 B2 * | 3/2006 | Davie et al. | .................. | 324/658 |
| 7,015,715 B2 * | 3/2006 | Parrish et al. | ................. | 324/765 |
| 7,046,028 B2 * | 5/2006 | Goto | ........................ | 324/756.01 |
| 7,208,960 B1 * | 4/2007 | Deangelis et al. | ............ | 324/661 |
| 7,378,856 B2 * | 5/2008 | Peine et al. | .................. | 324/662 |

* cited by examiner

*Primary Examiner* — Jeff Natalini
(74) *Attorney, Agent, or Firm* — Parsons Behle & Latimer

(57) ABSTRACT

A non-conductive composite doubler is fabricated for application to an electrically conductive surface of a structure by: forming the composite doubler; placing an array of capacitive gap thickness sensors between the doubler and the structure surface; measuring the gap thickness between the doubler and the structure surface in a plurality of areas over the surface of the structure; using the gap thickness measurements to shape a layer of adhesive to essentially match the contour of the structure surface; and, applying the layer of adhesive to the doubler.

25 Claims, 5 Drawing Sheets

GAP MAPPING FOR FITTING COMPOSITE DOUBLERS

TECHNICAL FIELD

The disclosure generally relates to methods and devices for measuring gaps between parts or surfaces, and deals more particularly with a method and apparatus for mapping gaps between a composite doubler and a structure surface, as well as a method of fitting the doubler to the surface.

BACKGROUND

Composite doublers may be frequently used to repair both metallic and polymer-matrix composite aircraft structures. The doublers are bonded to the surface of the structure using one or more layers of a suitable adhesive. It is normally important to achieve a good bond between the doubler and the structure across the entire area of the doubler. However, in some cases, the surface of the structure may be uneven, and/or contain one or more depressions which create gaps between the doubler and the structure surface. In order to assure a complete bond having maximum strength, the gaps should be filled with adhesive. Accordingly, it is necessary to determine the size and location of the gaps between the doubler and the structure surface.

Existing techniques for measuring gaps between a structure surface and a doubler are time consuming, and measurement results may be depend upon the skill of the technician who makes the measurements and interprets the results. Moreover, the fact that the doubler is non-conductive and the structure surface is conductive limits the number of existing techniques that may be used for gap measurement.

Various devices are available for measuring gaps between two parts, but none is effective in rapidly mapping the gaps across the entire area of the doubler, particularly where the gaps are being measured between a conductive surface and a non-conductive surface. One known position sensing technology relies on the use of capacitive sensors. For example, capacitive blankets have been devised that are used as proximity sensors and boundary penetration sensors in security applications. These sensors detect the approach of intruders or the touching of a metal item or container that the sensors are intended to protect. Capacitive sensors have also been used to measure the gap between two conductive surfaces.

Accordingly, there is a need for a method and apparatus for rapidly mapping the gaps between a composite doubler, and a metal structural surface that is accurate, reliable and repeatable.

SUMMARY

In accordance with the disclosed embodiments, gaps between a composite doubler and a structural surface may be mapped across the entire area of the doubler, rapidly and reliably. The gaps may be measured virtually simultaneously at multiple locations across the doubler. The measurement results may be used to produce a two dimensional map of the gaps that can then be used as a pattern to shape one or more layers or plies of an adhesive material that is used to bond the doubler to the structure surface. Alternatively, the map data can be used by an NC controller to automatically cut one or more layers/plies of the adhesive material in order to shape an adhesive layer to match, and thereby fill the gaps.

In accordance with one embodiment, apparatus is provided for measuring and mapping gaps between a first conductive surface and a second non-conductive or relatively conductive surface. The apparatus comprises: a first layer of dielectric material adapted to be placed against the first conductive surface; a second layer of electrically conductive material adapted to be placed against the second non-conductive surface; a plurality of capacitive devices sandwiched between the first and second layers, each of the capacitive devices producing signals representing a measurement of the gap between the first and second surfaces in the area of the device; and, a processor coupled with the capacitive devices for mapping the gaps. The first and second layers and the capacitive devices are mounted together to form a blanket that may be removably interposed between the first and second surfaces. The apparatus may further include a multiplexer for multiplexing signals applied to the capacitive devices. An image processing program may be used by the processor to generate a two dimensional map of gap thickness values.

In accordance with another embodiment, apparatus is provided for measuring gaps between two surfaces over a two dimensional area, comprising: first and second layers of material; a two dimensional array of capacitive sensing devices between the first and second layers, each of the capacitive devices measuring the gap thickness in the area surrounding the sensing device; and, a processor for processing the gap thickness measurements. The first and second layers of material may be a dielectric material. The capacitive sensing devices are arranged into first and second layers for respectively sensing the gap thickness between one of the layers and one of the surfaces. Each of the capacitive devices may include a metallized, electrical coil arranged along an orthogonal grid. One of the surfaces may be electrically non-conductive and the apparatus may further comprise a layer of electrically conductive material sandwiched between one of the first and second layers and the non-conductive surface.

In accordance with a disclosed method embodiment, mapping gap thicknesses between a first conductive surface and a second non-conductive or relatively conductive surface, comprises the steps of: placing a first layer of dielectric material against the first conductive surface; placing a second layer of conductive material against the second non-conductive surface; interposing an array of capacitive sensing devices between the first and second layers; sensing the thickness of the gap between the first and second surfaces at each of a plurality of locations using the capacitive sensing devices; and, collecting signals from the capacitive sensing devices representing the measured gap thicknesses. The method may further comprise using the collected signals to generate a data file representing a two dimensional array of gap thickness values.

According to another disclosed method embodiment, fabricating a composite doubler for application to the surface of a structure, comprises the steps of: forming the composite doubler; placing an array of capacitive gap thickness sensors between the doubler and the structure surface; measuring the gap thickness between the doubler and the structure surface in a plurality of areas over the surface of the structure; using the gap thickness measurements to shape a layer of adhesive to essentially match the contour of the structure surface; and, applying the layer of adhesive to the doubler. The method may further comprise the steps of interposing a layer of dielectric material between the gap thickness sensors and the structure surface, and interposing a layer of electrically conductive material between the gap thickness sensors and the doubler. The layer of adhesive may be shaped by using the gap thickness measurements to control the operation of an NC cutter that cuts the adhesive to the desired shape.

According to another method embodiment, bonding a composite doubler on an uneven structural surface, comprises the steps of: placing a gap-measuring blanket on the structural surface; placing the doubler on the blanket; measuring the gap between the structural surface and the doubler at a plurality of locations using the blanket; using the gap measurements to generate a data file representing a map of the gap thicknesses between the doubler and the structural surface; shaping a surface of an adhesive layer using the data file; and, placing the shaped adhesive layer between the doubler and the structural surface such that the shaped surface of the adhesive layer fills the gaps between the doubler and the structural surface.

Embodiments of the disclosure satisfy a need for method and apparatus for rapidly mapping the gaps between a composite doubler and a structural surface that is accurate, reliable and repeatable.

Other features, benefits and advantages of the disclosed embodiments will become apparent from the following description of embodiments, when viewed in accordance with the attached drawings and appended claims

BRIEF DESCRIPTION OF THE ILLUSTRATIONS

DETAILED DESCRIPTION

Figure 1:
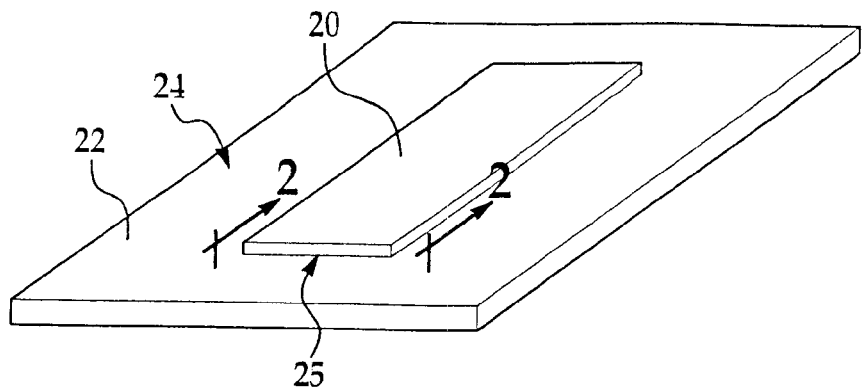
FIG. 1 is a perspective view of a composite doubler bonded to the surface of a structure.

Embodiments of the disclosure relate to a method and apparatus for fitting and applying a composite doubler 20 on the outer surface 24 of a structure 22. The structure 22 may comprise, without limitation, a metallic outer skin of an aircraft requiring repair or reinforcement in the area where the doubler 20 is applied to the structure 22. The doubler 20 may comprise multiple, cured plies of reinforced synthetic resin, such as carbon-fiber epoxy, for example. The electrical conductivity of the doubler 20 may be vary depending on the conductivity of the material used to form the doubler 20. For example, in the case of a doubler 20 formed of carbon fiber reinforced epoxy, the doubler 20 may be relatively conductive, depending, at least in part, on the degree of exposure and/or grounding of the carbon fibers bound within the epoxy matrix. Although both the doubler 20 and the structural surface 24 are shown as being flat in FIGS. 1 and 2, it is to be understood that they may be curved in one or more directions, or may comprises a combination of flat and curved surfaces. Also, although the doubler 20 is shown as being rectangular in FIG. 1, it may be any of numerous other shapes to suit the particular application.

Figure 2:
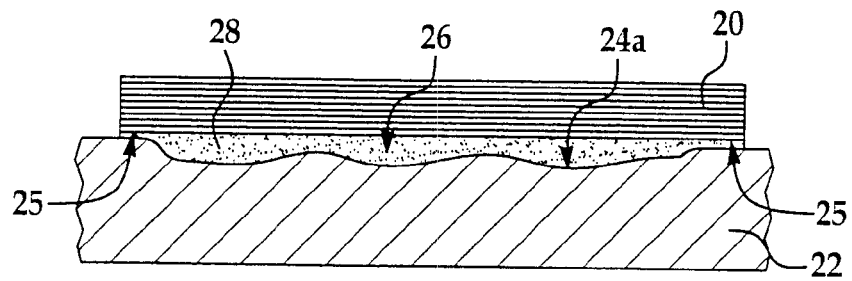
FIG. 2 is a sectional view taken along the line 2-2 in FIG. 1.

As best seen in FIG. 2, the outer surface 24 of the structure 22 may include uneven surface areas 24a which create one or more gaps 26 at the interface 25 between the doubler and the surface 24. In accordance with the disclosed embodiments, the doubler 20 is bonded to the surface 24 by a layer of a suitable adhesive 28. As will be discussed in more detail below, the layer of adhesive 28 may comprise a build-up of multiple plies 28a, 28b (FIG. 7) that are each shaped such that the contour of the doubler 20 matches the irregular surface 24a. Since the contour of the doubler 20 matches that of the surface 24, the gaps 26 are filed with adhesive, assuring a complete bond over the entire area of the interface 25.

Figure 3:
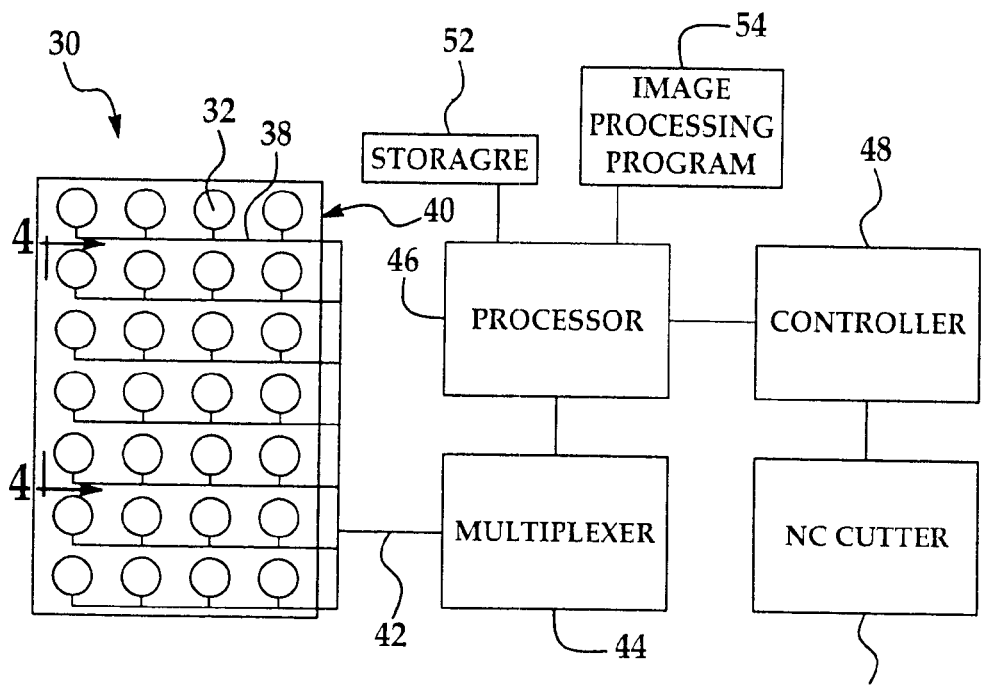
FIG. 3 is a combined block and diagrammatic view of a system used to fit the doubler shown in FIGS. 1 and 2 to the surface of the structure.
Figure 4:
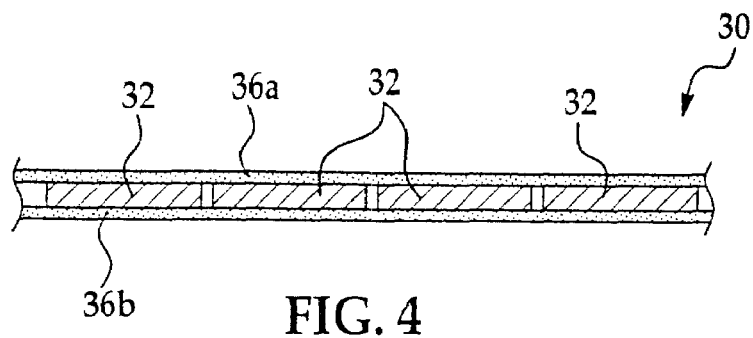
FIG. 4 is a sectional view taken along the line 4-4 in FIG. 3.

Referring now also to FIGS. 3 and 4, a gap thickness measuring blanket 30 is used to measure the gap 26 at each of a plurality areas across the interface 25. The gap thickness measuring blanket 30 produces a set of data representing a two dimensional map of the gap thickness values across the area of the interface 25. In the illustrated embodiment, the blanket 30 is generally rectangular in shape, matching the shape of the doubler 20. However, the blanket 30 may be larger than the doubler 20 so that a single blanket 30 may be used to map gaps for a range of doubler sizes and geometries.

In one embodiment, the blanket 30 broadly comprises a single two dimensional array of capacitive coils 32 lying in a common plane and sandwiched between a pair of dielectric layers 36a, 36b. A suitable adhesive may be used to bond the capacitive coils 32 to the dielectric layers 36a, 36b. The blanket 30 may have some degree of flexibility to allow it to conform to the contour of the structure surface 24, especially where surface 24 may be curved. In one embodiment providing satisfactory results, the capacitive coils 32 are arranged along an XY or orthogonal grid and are spaced approximately one half inches apart. The thickness of the dielectric layers 36a, 36b may depend on the application.

As shown in FIG. 3, each of the capacitive coils 32 is connected by a conductor 38 which terminates in a connection along one edge 40 of the blanket 30. Conductors 38 are connected by a cable 42 to a multiplexer 44 which may use any of various known multiplexing techniques to sequentially address and energize the capacitive coils 32, as well as collect responsive signals from the coils 32 representing gap measurements. Each of the capacitive coils 32 measures the gap 26 in the area surrounding the capacitive coil 32. The areas of measurement by the coils 32 may overlap to assure that the entire area of the interface 25 is mapped.

Gap measurements by the capacitive coils 32 are collected by the multiplexer 44 and delivered to a processor 46 which may comprise a programmed computer having suitable storage 52 (memory) and an image processing program 54 for processing data representing the gap measurements. As will be discussed in more detail below, the processor 46 may create a data file representing a two dimensional map of gap thicknesses that may be used by a controller 48 to control the operation of an NC (numerical control) cutter 50 which cuts one or more plies of adhesive material in order to fabricate the shaped adhesive layer 28 that fills the gaps 26.

Figure 5:
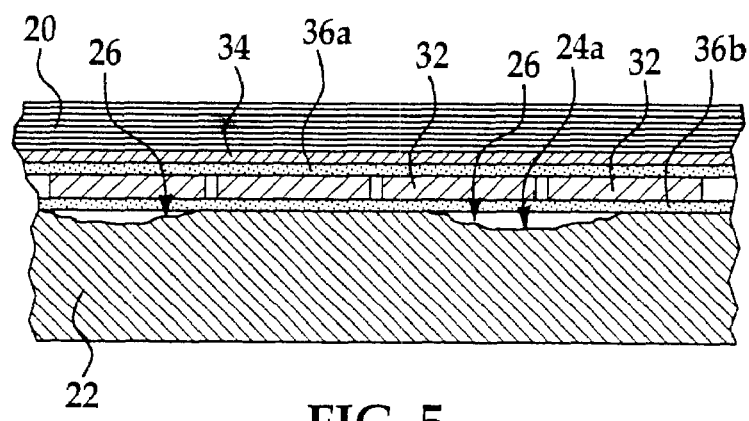
FIG. 5 is a sectional view showing a gap measuring blanket placed between the doubler and the structure surface.
Figure 6:
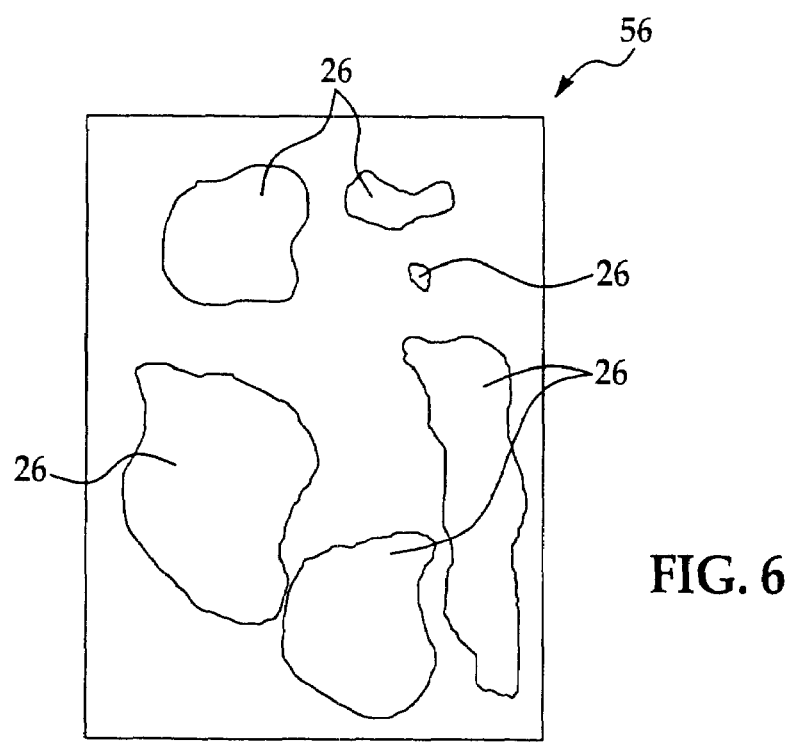
FIG. 6 is a plan illustration of a two dimensional map of gap thickness values.

Referring now also to FIG. 5, in order to measure the gaps 26 over the area of the interface 25, the blanket 30 is placed between the surface 24 of the structure 22 and the cured doubler 20. In the case where the doubler 20 contains fibers that are not sufficiently conductive to act as a capacitor plate, it may be necessary to sandwich a layer 34 of conductive material, such as a metal foil, between the bottom face of the doubler 20 and the upper dielectric layer on the blanket, which will act as a capacitor plate. The conductive layer 34 should intimately contact the face of the doubler 20. The conductive layer 34 may be adhesively applied to the either the face of the doubler 20 or to the dielectric layer 36a, and may be removed after gap measurements are completed. The first dielectric layer 36a insulates the coils 32 from conductive layer 34, and the second dielectric layer 36b insulates the capacitive coils 32 from the electrically conductive structure 22. Thus, the conductive layer 34 and the coils 32 each comprise a plate of a capacitor. Energizing the coils 32 charges the capacitor, resulting in a voltage signal whose magnitude depends upon the depth of the gaps 26 in the area of the capacitive coil 32. These voltage signals, respectively representing the depth of the gap 26 in the area of each capacitive coil 32, are multiplexed and processed by the processor 46 to produce a two dimensional map of gap thicknesses, as shown in FIG. 6. The area of the gaps 26 may be color coded to represent the gap thickness.

Figure 7:
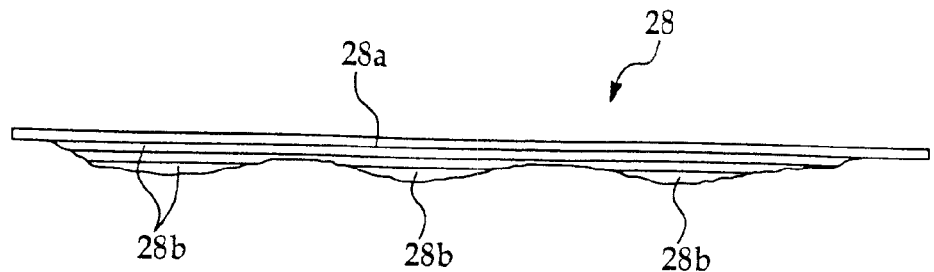
FIG. 7 is a side view of the adhesive layer shown in FIG. 2, showing the build-up of multiple plies layers uniquely shaped to fill gaps between the doubler and the structure surface.

FIG. 7 shows how the adhesive layer 28 may be built-up from a plurality of plies 28a, 28b of adhesive material that has been cut to a specific shape using the maps shown in FIG. 6 as a pattern. Some of the plies 28a may be coextensive with the doubler 20, while others of the plies 28b may have unique shapes that match the gaps 26 they are intended to fill.

Figure 8:
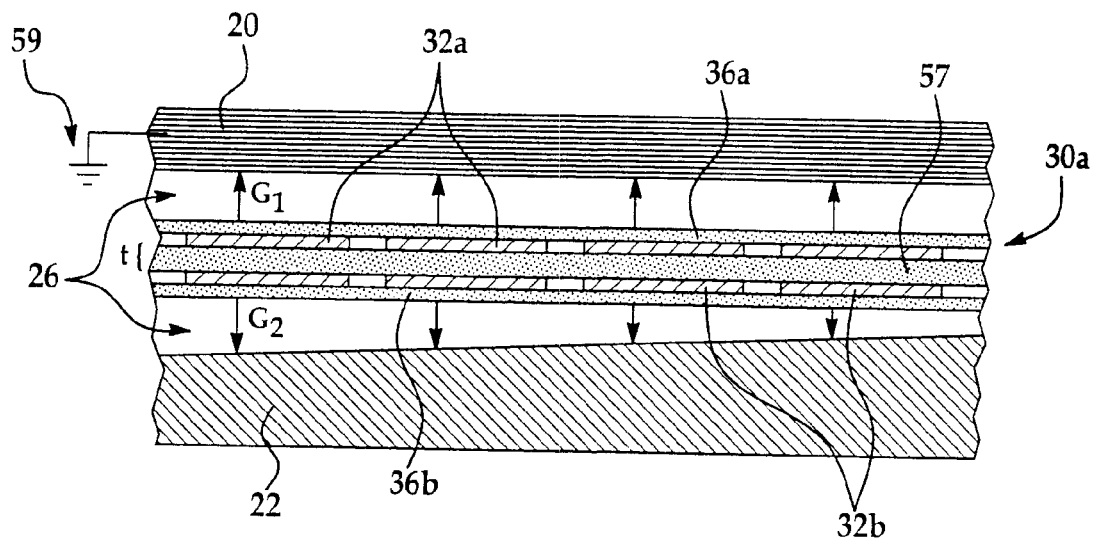
FIG. 8 is a sectional view illustrating an alternate form of the gap measuring blanket placed in a gap between two surfaces.

FIG. 8 illustrates a dual sided embodiment of a gap measuring blanket 30a. Whereas the gap measuring blanket 30 shown in FIG. 4 is placed against one of the two surfaces between which the gap 26 is to measured, the blanket 30a may be placed anywhere within the gap 26, but not necessarily against either surface. Thus for example, as shown in FIG. 8, the blanket 30a is disposed within the gap 26 intermediate the surfaces defined by structure 22 and a doubler 20. The blanket 30a comprises two layers of capacitive coils 32a, 32b which are separated by a dielectric layer 57, and function to respectively measure gaps $G_1$ and $G_2$ on opposite sides of the blanket 30a. Outer dielectric layers 36a, 36b respectively insulate the layers of coils 32a, 32b from the doubler 23 and the structure 22. In operation, each of the coils 32a, 32b measures the gap distance from the coil 32a, 32b to the surface of either the doubler 20 or the structure 22. The processor 46 adds the signals of the coils 32a, 32b to obtain the total gap distance, which comprises the sum of the gaps $G_1$, $G_2$ plus the thickness "t" of the dielectric layer 57. In some applications, the blanket 30a may be more sensitive and provide more accurate gap measurements than the blanket 30 shown in FIG. 4. Note that in the application shown in FIG. 8, a conductive layer (layer 34 in FIG. 5) need not be placed against the doubler 20 because the conductive fibers in the doubler 20 have been connected to a ground 59, enabling the doubler 20 to act as a capacitor plate.

Figure 9:
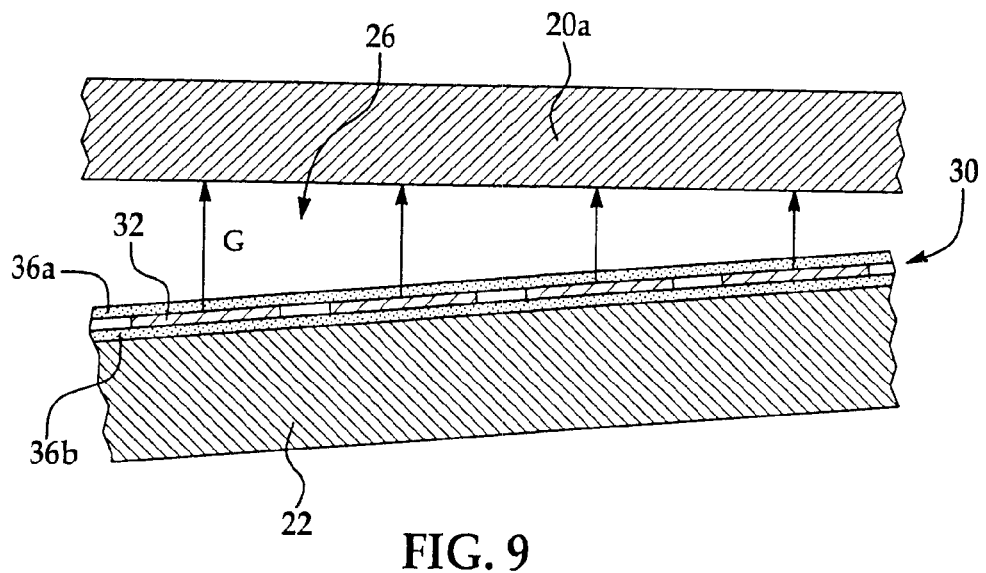
FIG. 9 is a sectional view illustrating the gap measuring blanket of FIG. 4 placed against one of two surfaces forming a gap to be measured.

FIG. 9 shows the blanket 30 placed between two electrically conductive structures 20a, 22, for measuring the gap "G". The blanket 30 may be held against the surface of structure 22 using tape (not shown) or other means, and thus may be positioned on one side of the gap "G". In this example, the coils 32 form one of the capacitor plates and the conductive structure 20a forms the other plate.

Figure 10:
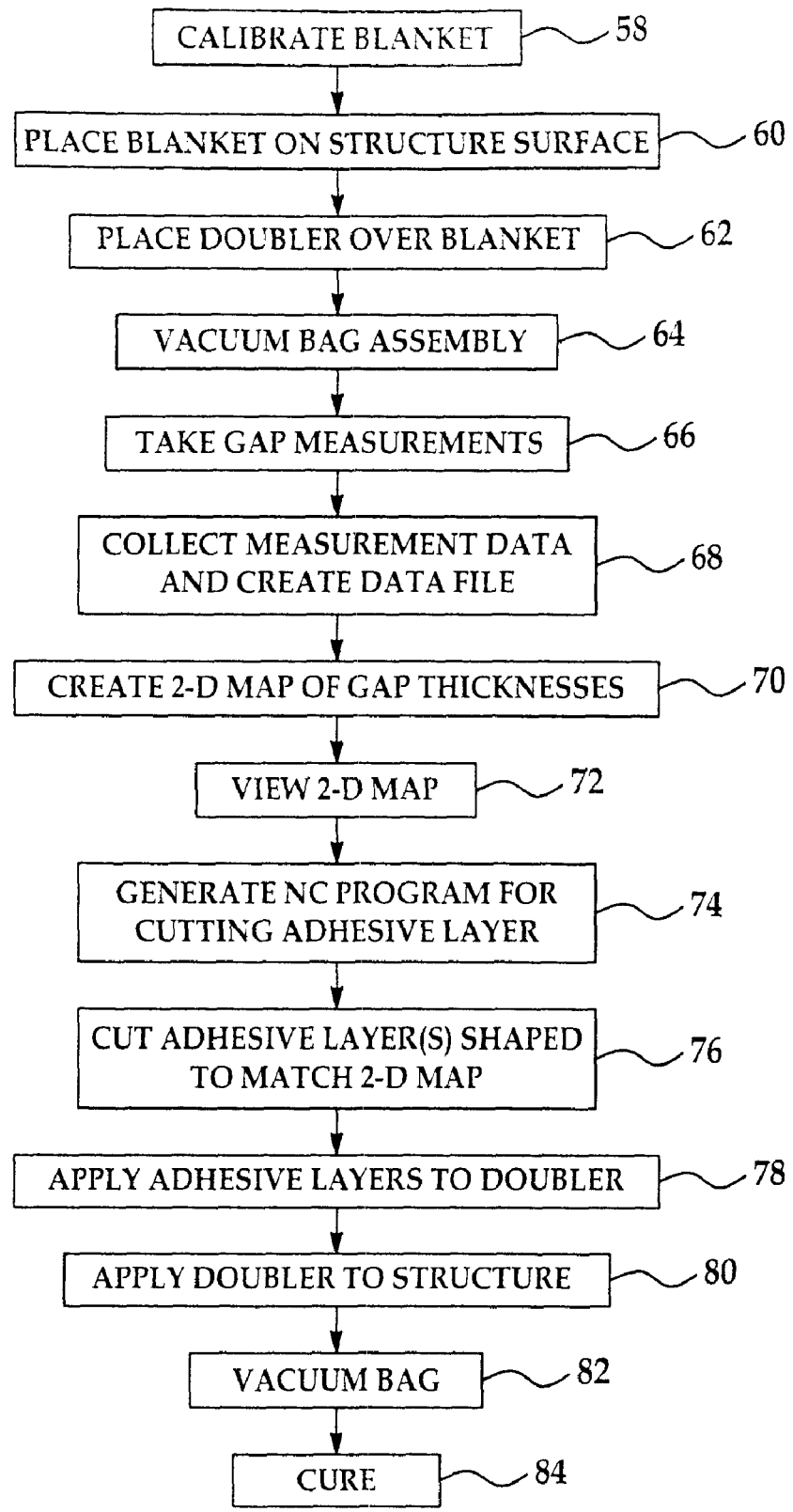
FIG. 10 is a flow diagram illustrating a method for mapping gaps and bonding a doubler to the structure surface.

Additional details of a method for gap measurement and doubler fitting are shown in FIG. 10. Beginning at step 58, the blanket 30 may be calibrated by placing it over a reference gap (not shown) having a known thickness, and then adjusting base line data used by processor 46 to calculate gap thickness based on measured values of voltage. Next, at step 60, the blanket 30 is placed on the structure surface 24, in the area where the doubler 20 is to be bonded to the structure 22.

At step 62 the doubler 20 is then placed over the blanket 30 so that the bottom of the doubler 20 is in face-to-face contact with the conductive layer 34. At 64, the assembly that includes the doubler 20 and the blanket 30 is vacuum bagged, causing the combination of the doubler 20 and the blanket 30 to be compressed downwardly against the structure 22.

At step 66, gap measurements are taken, in which the multiplexer 44 applies power to the capacitive coils 32 which results in a series of voltage signals being produced that represent gap measurements. The measurement data is collected by the multiplexer 44 to produce a data file at 68 which represents the gap measurements as a function of their locations. At step 70, the data file is used to create a two dimensional map of gap thicknesses. In one embodiment, the two dimensional map may be viewed by an operator at 72 and printed out in hard copy. The hard copy printout can be then used as a template for manually cutting those plies 28b of an adhesive that are required to fill the gaps 26.

Alternatively, as shown at step 74, an NC program can be generated for controlling an NC cutter 50 that automatically cuts the adhesive plies based on the data file created at step 68. Using the data file created at step 68 and the NC program generated at step 74, one or more adhesive plies are cut with shapes matching the patterns on the two dimensional map, as shown at step 76. Next, at step 78, the adhesive layers are applied to the doubler 20. Then, at step 80, the doubler having the adhesive layer 28 applied thereto is applied to the structure 22. Then, at step 82, the assembly of the structure 22, doubler 20 and adhesive layer 28 are vacuum bagged, following which the assembly of the doubler 20 and the structure 22 are cured at step 84.

It should be noted here that although the steps of the method embodiments disclosed above have been described as being carried out in a particular order for illustrative purposes, it is possible to perform the steps of these methods in various other orders.

Figure 11:
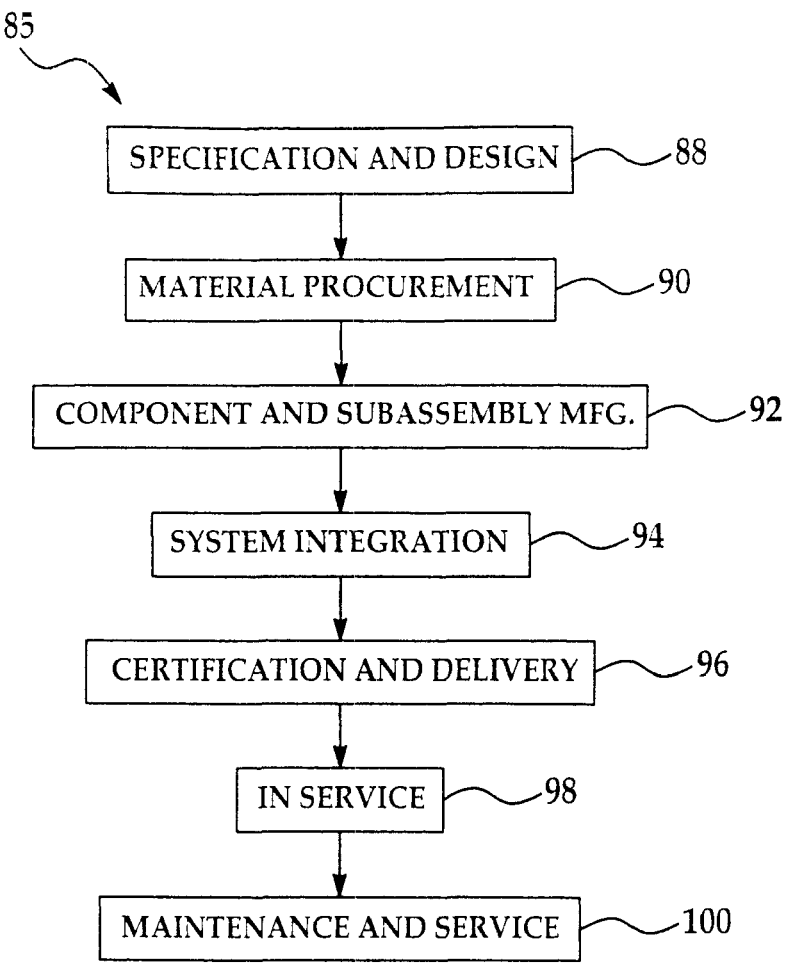
FIG. 11 is a flow diagram of aircraft production and service methodology.
Figure 12:
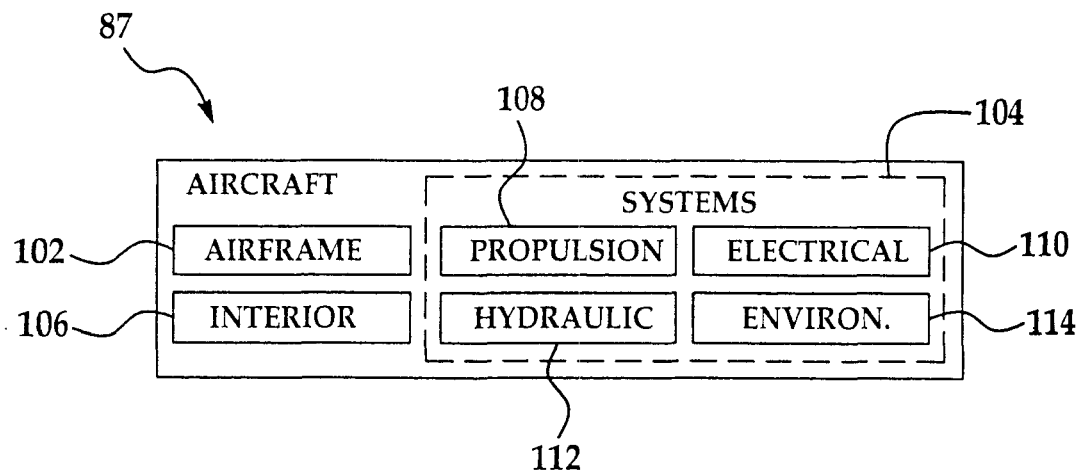
FIG. 12 is a block diagram of an aircraft.

Embodiments of the disclosure may find use in a variety of potential applications, particularly in the transportation industry, including for example, aerospace and automotive applications. Thus, referring now to FIGS. 10 and 11, embodiments of the disclosure may be used in the context of an aircraft manufacturing and service method 85 as shown in FIG. 11 and an aircraft 87 as shown in FIG. 12. Aircraft applications of the disclosed embodiments may include, for example, without limitation, composite stiffened members such as fuselage skins, wing skins, control surfaces, hatches, floor panels, door panels, access panels and empennages, to name a few. During pre-production, exemplary method 85 may include specification and design 88 of the aircraft 87 and material procurement 90. During production, component and subassembly manufacturing 92 and system integration 94 of the aircraft 87 takes place. Thereafter, the aircraft 87 may go through certification and delivery 96 in order to be placed in service 98. While in service by a customer, the aircraft 87 is scheduled for routine maintenance and service 100 (which may also include modification, reconfiguration, refurbishment, and so on).

Each of the processes of method 85 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 12, the aircraft 87 produced by exemplary method 85 may include an airframe 102 with a plurality of systems 104 and an interior 106. Examples of high-level systems 104 include one or more of a propulsion system 108, an electrical system 110, a hydraulic system 112, and an environmental system 114. Any number of other systems may be included. Although an aerospace example is shown, the principles of the disclosure may be applied to other industries, such as the automotive industry.

Apparatus and methods embodied herein may be employed during any one or more of the stages of the production and service method 85. For example, components or subassemblies corresponding to production process 108 may be fabricated or manufactured in a manner similar to components or subassemblies produced while the aircraft 87 is in service. Also, one or more apparatus embodiments, method embodiments, or a combination thereof may be utilized during the production stages 92 and 94, for example, by substantially expediting assembly of or reducing the cost of an aircraft 87. Similarly, one or more of apparatus embodiments, method embodiments, or a combination thereof may be utilized while the aircraft 87 is in service, for example and without limitation, to maintenance and service 100.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A method of mapping gap thicknesses between a first electrical conductor surface and a second electrical non-conductor surface, comprising:
    placing an array of capacitive gap thickness sensors between a structure providing the first electrical conductor surface and a composite doubler providing the second electrical non-conductor surface;
    the gap thickness sensors being incorporated in a blanket including a first flexible layer of dielectric material against the first electrical conductor surface and a second flexible layer of dielectric material, the array of capacitive gap thickness sensors being between the first and second layers;
    placing a third layer of electrical conductor material between the second layer and the second electrical non-conductor surface of the composite doubler;
    sensing the thickness of a respective gap between the first and second surfaces at each of a plurality of locations using a respective capacitive gap thickness sensor of the sensor array, said thickness of a respective gap sensed in an area surrounding said respective gap;
    collecting signals from the sensor array representing the measured gap thicknesses; and
    using the collected signals to generate a data file representing a two-dimensional array of gap thickness values.

2. The method of claim 1, further comprising the step of:
    using the measured gap thicknesses to shape a layer of adhesive to substantially match a contour of the first surface; and
    applying the shaped layer of adhesive to the first surface.

3. The method of claim 1, further comprising:
    multiplexing a plurality of electrical power signals; and
    driving the capacitive gap thickness sensors using the multiplexed power signals.

4. The method of claim 1, wherein the structure comprises a component of an aircraft.

5. The method of claim 1, further comprising removing the sensor array from between the first and second surfaces.

6. The method of claim 1, further comprising:
    generating a numerical control (NC) program using the measured gap thicknesses;
    using the NC program to control a NC cutter; and
    cutting a shape of a layer of adhesive using the NC cutter.

7. An apparatus for mapping gap thicknesses between a first electrically conductive surface and a second electrically non-conductive surface, comprising:
    an array of capacitive gap thickness sensors in a blanket including a first flexible layer of dielectric material configured to be placed against the first electrically conductive surface and a second flexible layer of dielectric material, the array of capacitive gap thickness sensors being between the first and second layers;
    a composite doubler including the second electrically non-conductive surface, the blanket being between the first electrically conductive surface and the second electrically non-conductive surface;
    a third layer of electrically conductive material between the second layer and the second electrically non-conductive surface of the composite doubler;
    the sensor array being configured to sense the thickness of a respective gap between the first and second surfaces at each of a plurality of locations using a respective capacitive gap thickness sensor of the sensor array at a respective location of the plurality of locations; and
    a processor coupled with the sensor array, the processor being configured to receive signals collected from the sensor array representing the measured gap thicknesses and to use the collected signals to generate a data file representing a two-dimensional array of gap thickness values.

8. The apparatus of claim 7, wherein the conductive third layer is adhered to the blanket.

9. The apparatus of claim 7, wherein the conductive third layer is adhered to the composite doubler.

10. The apparatus of claim 7, wherein individual gap thickness sensors comprise an electrical coil and the sensor array comprises more than four gap thickness sensors.

11. The apparatus of claim 7, further comprising a multiplexer configured to multiplex the signals produced by the sensor array.

12. The apparatus of claim 7, further comprising an image processing program configured for use by the processor to generate a two-dimensional map of the gap thickness values.

13. The apparatus of claim 7, further comprising a controller configured to use the data file to control a numerical control (NC) cutter further configured to cut a shape of a layer of adhesive.

14. An apparatus for mapping gap thicknesses between a first electrically conductive surface and a second surface, comprising:
    an array of first capacitor plates between a first layer of dielectric material and a second layer of dielectric material, the first layer being configured to be placed against the first electrically conductive surface;
    a composite doubler including the second surface, the first and second layers being between the first electrically conductive surface and the second surface;
    a third layer of electrically conductive material in contact with the second surface of the composite doubler, the third layer being configured to operate as a second capacitor plate;
    the array of first capacitor plates and the second capacitor plate being configured to sense the thickness of a respective gap between the first and second surfaces at each of a plurality of locations using a respective first capacitor plate of the array at a respective location of the plurality of locations; and a processor coupled with the plate array, the processor being configured to receive signals collected from the plate array representing the measured gap thicknesses and to use the collected signals to generate a two-dimensional array of gap thickness values.

15. The apparatus of claim 14, wherein the conductive third layer is between the dielectric second layer and the second surface of the composite doubler.

16. The apparatus of claim 14, wherein the conductive third layer comprises conductive fibers of the composite doubler and forms the second surface.

17. The apparatus of claim 14, wherein individual first capacitor plates comprise an electrical coil and the plate array comprises more than four first capacitor plates.

18. The apparatus of claim 14, further comprising a multiplexer configured to multiplex the signals produced by the plate array.

19. The apparatus of claim 14, further comprising an image processing program configured for use by the processor to generate a two-dimensional map of the gap thickness values.

20. The apparatus of claim 14, further comprising a controller configured to use the gap thickness values to control a numerical control (NC) cutter further configured to cut a shape of a layer of adhesive.

21. A method of mapping gap thicknesses between a first electrically conductive surface and a second surface, comprising:

placing an array of first capacitor plates between a structure providing the first electrically conductive surface and a composite doubler providing the second surface;

the first capacitor plates being between a first layer of dielectric material and a second layer of dielectric material, the first layer being against the first electrically conductive surface;

placing a third layer of electrically conductive material in contact with the second surface of the composite doubler, the third layer being configured to operate as a second capacitor plate;

sensing the thickness of a respective gap between the first and second surfaces at each of a plurality of locations using a respective first capacitor plate of the array at a respective location of the plurality of locations;

collecting signals from the plate array representing the measured gap thicknesses; and using the collected signals to generate a two-dimensional array of gap thickness values.

22. The method of claim 21, wherein the collected signals are used to generate a data file representing the two-dimensional array of gap thickness values and further comprising:

using the measured gap thicknesses to shape a layer of adhesive to substantially match a contour of the first surface; and applying the shaped layer of adhesive to the first surface.

23. The method of claim 21, further comprising:

multiplexing a plurality of electrical power signals; and driving the first capacitor plates using the multiplexed power signals.

24. The method of claim 21, wherein the structure comprises a component of an aircraft.

25. The method of claim 21, further comprising removing the sensor array from between the first and second surfaces.

* * * * *